UNITED STATES PATENT OFFICE.

HARRY P. BASSETT, OF CATONSVILLE, MARYLAND.

TREATMENT OF ALUMINUM-BEARING MATERIALS.

1,079,589.     Specification of Letters Patent.     Patented Nov. 25, 1913.

No Drawing.     Application filed March 22, 1912. Serial No. 685,583.

*To all whom it may concern:*

Be it known that I, HARRY P. BASSETT, a citizen of the United States, residing at Catonsville, in the county of Baltimore City and State of Maryland, have invented certain new and useful Improvements in the Treatment of Aluminum-Bearing Materials, of which the following is a specification.

This invention relates to the treatment of aluminum bearing materials, such as clay, potassium and sodium feldspar, slate, granite or the like, and has for its principal object to provide a process for the separation of aluminum or aluminum salts from the aluminum bearing material.

Other objects and advantages of the invention will appear in the course of the following specification.

In the practice of my process, I preferably add to the clay, rock or other aluminum bearing material, sodium carbonate and sodium sulfate and furnace the mixture to the point of fusion, which occurs at a low red heat.

I prefer to mix the clay, rock or other aluminum bearing material with the reagents mentioned in the following proportions by weight: clay or aluminum bearing rock, 5 parts; sodium carbonate, 3 parts; sodium sulfate 2 parts. The reaction which occurs when the mixture is heated is believed to be represented by the following equation:

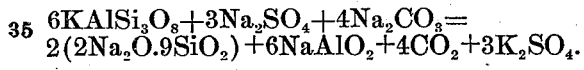
$$6KAlSi_3O_8 + 3Na_2SO_4 + 4Na_2CO_3 = 2(2Na_2O.9SiO_2) + 6NaAlO_2 + 4CO_2 + 3K_2SO_4.$$

The furnaced mixture is then extracted with water which dissolves the sodium aluminate ($NaAlO_2$) and potassium sulfate ($K_2SO_4$) leaving sodium silicate

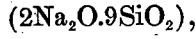
$$(2Na_2O.9SiO_2),$$

which is insoluble in water, undissolved.

In order to effect the separation of the aluminum from the solution, I pass carbon-dioxid through such solution, thereby transforming the aluminum into the form of aluminum hydroxid $Al(OH)_3$ which is a gelatinous mass. This gelatinous precipitate is separated from the solution preferably by centrifugal action, and may be dried, but is preferably treated with an alkali as sodium hydrate or sodium carbonate, and the aluminum obtained in the form of sodium aluminate ($NaAlO_2$).

In the treatment of clay, potash, feldspar, or other aluminum bearing materials which contain potash, I am able to advantageously separate the potash present, in the practice of my process.

Where potash is present in the material under treatment, it will be found in the solution after the precipitation of the aluminum hydroxid, as hereinbefore described, the treatment hereinbefore set forth being applicable to the treatment of aluminous materials containing potash as well as those containing no potash.

After the separation of the aluminum hydroxid as hereinbefore described, there is present in the solution sodium bi-carbonate ($NaHCO$), sodium sulfate ($Na_2SO_4$) and potassium bi-carbonate ($KHCO_3$). To this solution is added caustic alkali, preferably sodium hydroxid in an amount sufficient to transform the sodium bi-carbonate and potassium bi-carbonate present into normal sodium and potassium carbonate. After the treatment with the sodium hydrate the solution will contain sodium carbonate, potassium carbonate and sodium sulfate. This is heated to preferably about 60° C. to evaporate the solution and precipitate the sodium carbonate and sodium sulfate. The residual liquid consists of potassium carbonate in solution. The sodium silicate ($Na_2SiO_3$) hereinbefore referred to may be advantageously heated with an alkaline salt, preferably sodium carbonate, to fusion and dissolved in water to form water-glass.

While I have set forth the materials which I prefer to employ in the practice of my process, and the proportions in which I prefer to mix my reagents, it is to be understood that chemical equivalents of the reagents may be employed and that the proportions may be varied without departing from the spirit of my invention and the scope of the pending claims.

From the foregoing it will be seen that I have provided a process for the economical separation of aluminum from clay, slate, feldspar, or the like, and that my process enables me to economically separate potash where such potash is contained in the aluminum bearing materials under treatment.

While I prefer to employ an alkaline carbonate and an alkaline sulfate I have found that I am able to obtain some measure of success by employing alkaline earth salts in place of alkaline salts hereinbefore referred to and such procedure will form the subject matter of a separate application for Letters Patent.

Having thus described my invention, I claim:

1. The herein described process of treating clay, feldspar, slate and other aluminum bearing materials, which consists in heating the same with an alkali and an alkali metal sulfate, the alkali being employed in not to exceed three parts by weight, to five parts by weight of the aluminum bearing material and extracting the sulfate portion of the treated mass.

2. The herein described process of treating clay, feldspar, slate and other aluminum bearing materials, which consists in heating the same with sodium carbonate and sodium sulfate, the sodium carbonate being employed in not to exceed approximately three parts by weight, to five parts by weight of the aluminum bearing material.

3. The process of treating clay, feldspar, slate and other aluminum bearing materials which consists in heating the same with an alkali and an alkali metal sulfate in the proportions of five parts of the aluminum bearing material, not to exceed approximately three parts of the alkali and not to exceed approximately two parts of the alkali metal sulfate.

4. The herein described process of treating clay, feldspar, slate and other aluminum bearing materials which consists in heating the same with sodium carbonate and sodium sulfate in the approximate proportions of five parts of the aluminum bearing material and not to exceed approximately three parts of sodium carbonate and two parts of sodium sulfate and extracting the soluble portion of the treated mass.

5. The herein described process of treating clay, feldspar, slate and other aluminum bearing materials which consists in heating the same with sodium carbonate and sodium sulfate in approximately the following proportions by weight, five parts of the aluminum bearing material, three parts of the sodium carbonate and two parts of the sodium sulfate extracting the soluble portion of the treated mass, carbonating the solution to produce a precipitated aluminum hydroxid, and separating the precipitated aluminum hydroxid.

In testimony whereof I affix my signature in presence of two witnesses.

HARRY P. BASSETT.

Witnesses:
C. L. PARKER,
B. J. WASHBURNE.